350-96.25 SR
6/20/78 XR 4,095,888

United States Patent [19] [11] 4,095,888
Kawazu et al. [45] Jun. 20, 1978

[54] COLOR ELECTROPHOTOGRAPHY APPARATUS

[75] Inventors: Motoaki Kawazu; Masataka Ide; Atsushi Kawamura, all of Tokyo, Japan

[73] Assignee: Ricoh Company, Ltd., Tokyo, Japan

[21] Appl. No.: 585,202

[22] Filed: Jun. 9, 1975

[30] Foreign Application Priority Data

Jun. 10, 1974 Japan .................................. 49-65722
Jun. 14, 1974 Japan .................................. 49-67713

[51] Int. Cl.2 .............................................. G03B 27/74
[52] U.S. Cl. .......................................... 355/4; 355/1; 350/96.25; 96/1 R; 96/1.2
[58] Field of Search ................. 355/1, 3, 4, 8; 96/1 R, 96/1.2; 350/96 B

[56] References Cited

U.S. PATENT DOCUMENTS

| | | | |
|---|---|---|---|
| 3,267,555 | 8/1966 | Berger et al. | 96/1 R |
| 3,398,669 | 8/1968 | Hicks | 355/1 |
| 3,649,118 | 3/1972 | Yano | 350/96 B |
| 3,810,758 | 5/1974 | Tulagin et al. | 96/1.2 |

OTHER PUBLICATIONS

Technical Notes, RCA TN #645, 8/65, WAAS 2 pages.

*Primary Examiner*—Roland E. Martin, Jr.
*Assistant Examiner*—John L. Goodrow
*Attorney, Agent, or Firm*—Frank J. Jordan

[57] ABSTRACT

A rectangular array of rod lenses is arranged between an original document and a photoconductive member, and the document and photoconductive member move relative to the rod lens array at the same speed. The document is illuminated for three sequential color separation exposures so that three color images are formed on the surface of the photoconductive member by the rod lens array. Due to the construction of the means for illuminating the document, the brightness of the illumination is different for the three color separation exposures. This is compensated for by varying the number of rod lenses for the three color separation exposures and thereby the cross sectional area of the rod lens array which constitutes an exposure aperture so that the effective brightness of illumination is the same for the three color separation exposures.

7 Claims, 7 Drawing Figures

COLOR ELECTROPHOTOGRAPHY APPARATUS

The present invention relates to a method of exposing a photoconductive member for color electrophotography.

The color electrophotography method and apparatus to which the present invention is applicable involves exposing a photoconductive member such as a drum three times through three primary color separation filters respectively. After the drum is exposed through a filter, toner particles of the complementary color are applied to the photoconductive drum to form a color toner image which is transferred to a copy sheet. The photoconductive drum is then cleaned and the process is repeated for the next color so that three color toner images are sequentially produced and transferred to the copy sheet.

The problem with this method which the present invention overcomes is that the color separation filters have different values of transmittance, and furthermore a typical halogen light source for illuminating the original document emits more red light than green or blue light. The result is that the densities of the color toner images are not the same and the colors of the original document are not correctly reproduced.

In a flood type illumination system the problem may be overcome by varying the time of illumination of the original document or the aperture of an image forming lens. Both of these expedients tend to be inaccurate. In a slit illumination system the problem may be overcome by providing different scanning speeds for the different color imaging steps. This expedient is also inaccurate unless an expensive drive system is provided.

It is therefore an object of the present invention to provide a method of exposing a photoconductive member for electrophotography by using a rod lens array both for forming images of the original document on the photoconductive member and equalizing the effective brightness of illumination for the three color separation exposures.

It is another object of the invention to provide apparatus embodying the above method.

The above and other objects, features and advantages of the present invention will become apparent from the following detailed description taken with the following drawings, in which.

Figure 1:
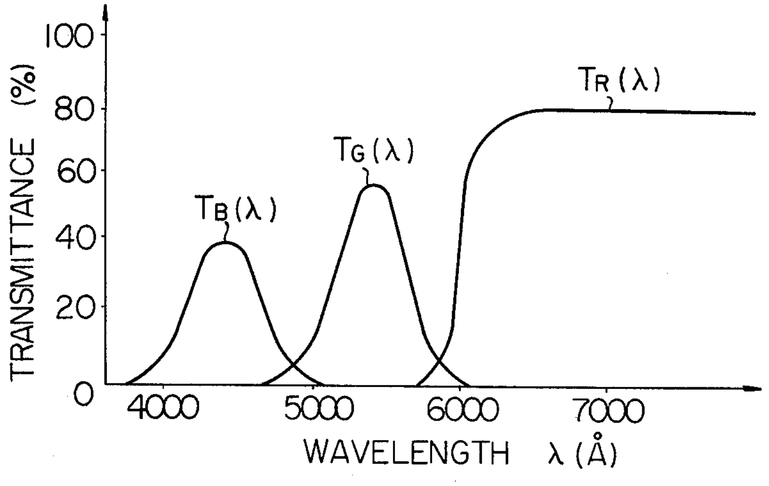
FIG. 1 is a graph showing the spectral transmittance of various color separation filters used in electrophotography.
Figure 2:
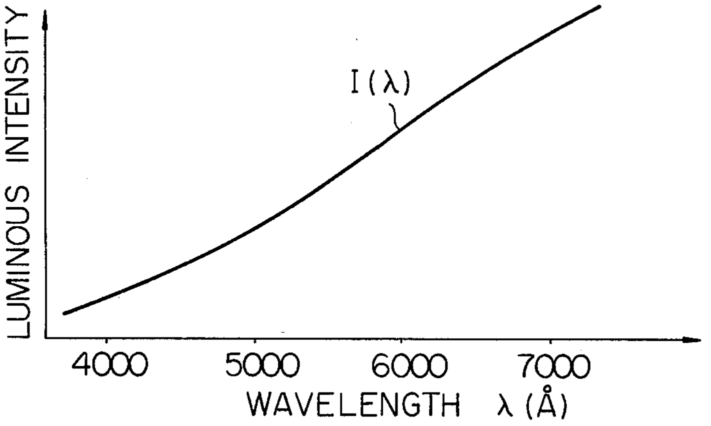
FIG. 2 is a graph showing the luminous intensity of a typical halogen lamp used as a source of illumination of an original document in electrophotography as a function of the wavelength.

Referring now to FIG. 1, curves $T_B(\lambda)$, $T_G(\lambda)$ and $T_R(\lambda)$ represent the transmittance of blue, green and red color separation filters respectively of the type which is widely used in color electrophotography. It will be seen that the maximum transmittance of these filters is about 40%, 60% and 80% respectively. Referring to FIG. 2, it will be seen that the luminous intensity I (λ) of a typical halogen white lamp has a spectral distribution such that much more red light is emitted than blue or green light. The brightness of light from the lamp emerging from the filters can be calculated by integrating the luminous intensity with respect to the wavelength. The results of this integration are presented in table 1 below with the results of the integration for blue light taken as unity and the results of the integration for green and blue light taken as ratios of the results for blue light.

Table 1

| Blue | Green | Red |
|---|---|---|
| $\int_{\lambda=0}^{\infty} I(\lambda)T_B(\lambda)d\lambda = 1$ | $\int_{\lambda=0}^{\infty} I(\lambda)T_G(\lambda)d\lambda = 4$ | $\int_{\lambda=0}^{\infty} I(\lambda)T_R(\lambda)d\lambda = 20$ |

It will be seen that 4 times as much light from the halogen lamp emerges from the green filter than from the blue filter, and 20 times as much light emerges from the red filter than from the blue filter. If uncorrected this would result in a tremendous distortion in the colors of the copy produced by the electrophotographic apparatus.

Figure 3:
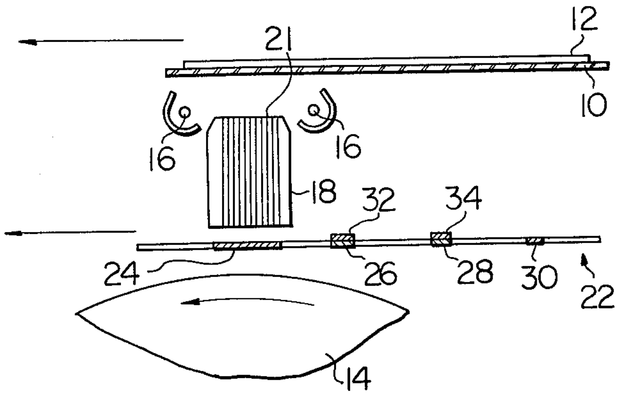
FIG. 3 is a schematic view of a first embodiment of the present invention.
Figure 4:
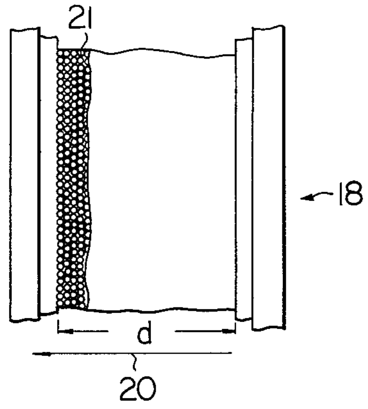
FIG. 4 is a fragmentary end view of a rod lens array used in the embodiment of the present invention shown in FIG. 3.

FIG. 3 shows a first embodiment of the present invention designed to overcome the problem described above. A transparent plate 10 supports an original document 12 and is moveable from right to left as viewed in FIG. 1. A photoconductive drum 14 is rotatable counterclockwise. The surface of the drum 14 is formed of a photoconductive material which has equal sensitivity for all wavelengths of visible light. Fixed halogen lamps 16 are provided to illuminate the bottom surface of the document 12 through the plate 10. A rod lens array 18 is formed of elongated light transmitting elements which will be described in detail below and is fixedly disposed between the surfaces of the document 12 and the drum 14. The rod lens array 18 consists of 20 rows of rod lenses 21 arranged so that the ends of the rod lenses 21 face the surfaces of the document 12 and drum 14 and the direction of the rows is perpendicular to the direction of movement of the plate 10. The rows of rod lenses 21 therefore define planes perpendicular to the plane of the drawing of FIG. 3. The adjacent rows are staggered by a distance equal to the radius of the rod lenses 21 so that the rod lenses 21 may be packed together as densely as possible. An arrow 20 in FIG. 4 indicates the direction of movement of the plate 10 relative to the rod lens array 18. The plate 10 and drum 14 are arranged to move so that the surface speeds thereof relative to the opposite ends of the rod lens array 18 are equal.

The rod lenses 21 are formed so that their index of refraction is maximum at the central axis and decreases parabolically as a function of radial distance from the central axis. This may be expressed mathematically as $$n(r) = N_o(1 - \tfrac{1}{2}Ar^2)$$

where $n(r)$ is the index of refraction as a function of radial distance from the central axis of the rod lens 21, $n(o)$ is the index of refraction at the central axis of the rod lens 21, $r$ is the radial distance from the central axis of the rod lens 21 and A is a constant.

The opposite ends of the rod lenses 21 are equally spaced from the surfaces of the document 12 and drum 14. The rod lenses 21 therefore act as converging lenses and form erect images of the document 12 on the surface of the drum 14. Individual rays of light propogate through the rod lenses 21 in such a manner that they oscillate about the central axis at a wavelength of $2r/\sqrt{A}$. The length $l$ of the rod lenses 21 is selected within a range of $$(1/a)\,(2\pi/\sqrt{A}) < (2\pi/\sqrt{A})$$

or any value within this range plus an integral multiple of $2\pi/\sqrt{A}$. A typical value of $l$ is $\frac{3}{4}(2\pi/\sqrt{A})$. The length of the rows of rod lenses 21 is equal to the length of the drum 14. The width of the portion of the rod lens array 18 occupied by the rod lenses 21 is designated as $d$. The cross sectional area of the rod lens array 18 can be approximated as $l \times d$ if the spaces between the rod lenses 21 are neglected.

Figure 5:
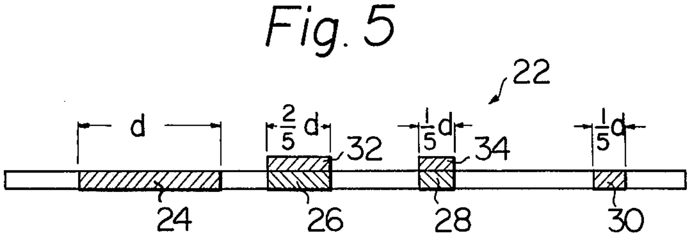
FIG. 5 is a cross section of a mask used in the embodiment shown in FIG. 3.

An opaque mask 22 which is shown in detail in FIG. 5 is movable between the bottom of the rod lens array 18 and the drum 14. The mask 22 has a width equal to $l$ which is equal to the length of the drum 14 and the length of the rod lens array 18 in a direction perpendicular to the direction of movement of the plate 10. The mask 22 is formed with a hole having a width length equal to $d$ in a direction parallel to the direction of movement of the plate 10 in which is disposed a blue filter 24 such as a wratten 5B filter. Another hole is formed in the mask 22 having a length equal to $(2/5)d$ in which is disposed a green filter 26 such as a wratten 5G filter. Another hole formed in the mask 22 having a length $(1/5)d$ receives a red filter 28 such as a wratten 5R filter. A neutral density filter 30 is received in a hole having a length of $(1/5)d$. Neutral density filters 32 and 34 are provided on top of the green and red filters 26 and 28 respectively.

In operation, the mask 22 is moved as indicated by an arrow in FIG. 3 so that the blue, green and red filters 24, 26 and 28 are sequentially disposed in the optical path of the rod lens array 18 for blue, green and red color separation exposures of the drum 14 respectively. The neutral density filter 30 is used for an optional monochrome (black and white) exposure to improve the contrast and detail of the reproduction.

The blue, green and red filters 24, 26 and 28 have transmittances of 40%, 60% and 80% respectively. The neutral density filters 30, 32 and 34 have transmittances of 20%, 62.5% and 25% respectively. The cross sectional area of the rod lenses 21 can be considered as an exposure aperture equivalent to an iris diaphragm of a camera lens. The effective brightness of the illumination of the document 12 by the lamps 16 is considered as the brightness of the light emerging from the filters 24, 26 and 28 if the document 12 were replaced by a mirror having 100% reflectance. The effective brightness is therefore a function of the wavelength of the light emitted by the lamps 16, the transmittance of the filters 24, 26, 28, 30, 32 and 34 and the areas of the holes in the mask 22 in which the filters are received which constitute the exposure aperture of the rod lens array 18.

In the case of the blue filter 24, the brightness of the illumination emerging therefrom as shown in table 1 is taken as unity and the exposure aperture is $l \times d$ which is also taken as unity. The effective brightness is therefore also unity.

In the case of the green filter 26, the brightness of the illumination emerging therefrom as shown in table 1 is 4 times that emerging from the blue filter 24. However, the exposure aperture only has an area of $2/5\ (d \times l)$ and the transmittance of the neutral density filter 32 is 62.5%. The effective brightness of illumination is therefore $4 \times 0.625$ which is also equal to unity.

In the case of the red filter 28, the brightness of illumination from table 1 is 20 times that for the blue filter 24. However, the exposure aperture is only $1/5\ (d \times l)$ and the transmittance of the neutral density filter 34 is 25%. The effective brightness of illumination is therefore $20 \times 1/5 \times 0.25$ which is also equal to unity.

From the above description it will be seen that the mask 22 comprising the filters 24, 26, 28, 30, 32 and 34 serves to provide the same brightness of illumination for the three color separation exposures and therefore faithful rendition of the colors of the original document 12. If desired, the neutral density filters 32 and 34 may be omitted and the holes in which the filters 26 and 28 are received made smaller to produce the same results.

Figure 6:
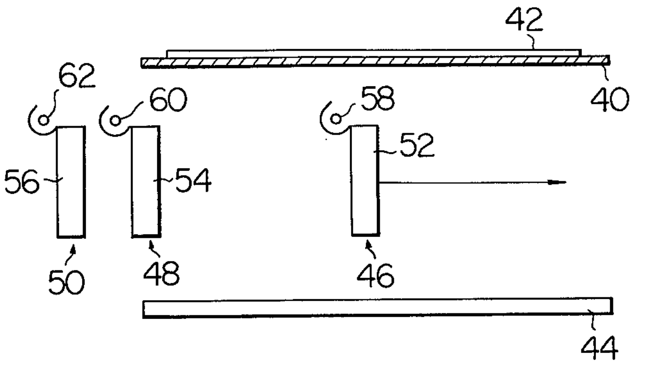
FIG. 6 is a schematic view of a second embodiment of the present invention.

FIG. 6 shows another embodiment of the present invention in which a transparent plate 40 supports an original document 42. A photoconductive member in the form of a plate 44 is disposed parallel to and below the plate 40. Three rod lens assemblies 46, 48 and 50 are movable between the plate 40 and photoconductive plate 44 in the direction of an arrow (rightward). The rod lens assemblies 46, 48 and 50 comprise rod lens arrays 52, 54 and 56 and light sources 58, 60 and 62 respectively. The rod lens arrays 52, 54 and 56 are essentially similar in construction to the rod lens array 18 shown in FIGS. 3 to 5. The light sources 58, 60 and 62 are formed of flourescent lamps with translucent coatings of blue, green and red material respectively. The number of rows of rod lenses in each of the rod lens arrays 52, 54 and 56 is selected so that even though the luminous intensities of the light sources 58, 60 and 62 are different, the effective brightness of illumination is the same in the manner described above. In operation, the assemblies 46, 48 and 50 are sequentially moved in the direction of the arrow to provide three respective color separation exposures for the plate 44.

Figure 7:
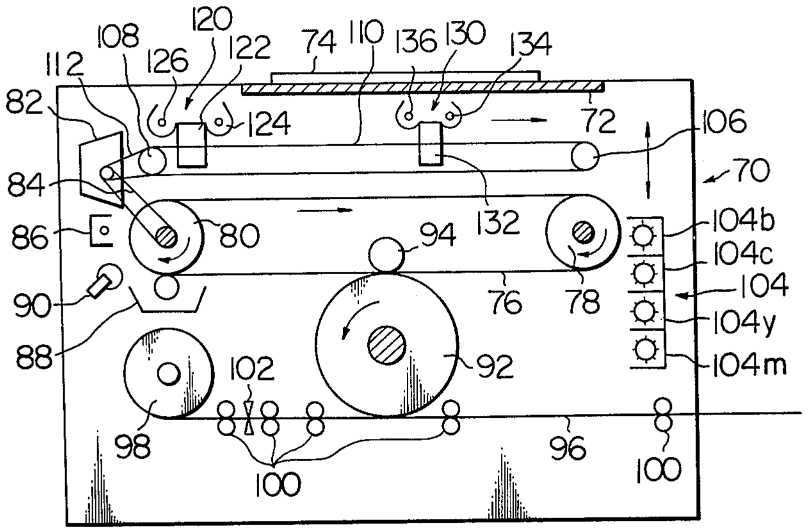
FIG. 7 is schematic view of a color electrophotography machine utilizing the embodiment of the invention shown in FIG. 6.

FIG. 7 shows a color copying machine generally designated as 70 for the purpose of placing the operation of the present invention in context. The machine 70 comprises a plate 72 supporting an original document 74. A photoconductive member in the form of an endless belt 76 is trained around rollers 78 and 80 and movable thereby parallel to and below the surface of the document 74. A motor 82 drives the roller 80 through a belt 84. A corona charging unit 86 is disposed adjacent to the surface of the belt 76. A cleaning unit 88 and discharging lamp 90 are also disposed adjacent to the belt 76 near the charging unit 86. The belt 76 is pressed into rolling contact with a drum 92 by a press roller 94. Copy paper 96 is provided in a roll 98. Guide rollers 100 are provided to guidably move the paper 96. A cutter 102 is provided to cut the paper 96.

A developer unit 104 is adapted to contact the belt 76 to transfer toner particles thereto and produce color toner images. The developer unit 104 comprises a black section **104*b*, a cyan section 104*c*, a yellow section 104*y* and a magenta section 104*m*** and is movable up and down as shown by an arrow.

A wire 110 is trained around pulleys 106 and 108, and the pulley 108 is rotatable by the motor 82 through a belt 112. Rod lens assemblies 120 and 130 are movable rightward as shown by an arrow by the wire 110 between the plate 72 and belt 76. The rod lens assembly 120 comprises a rod lens array 122, a red light source 124 and a blue light source 126. The rod lens assembly 130 comprises a rod lens array 132, a white light source 134 and a green light source 136. The red and blue light sources 124 and 126 produce about the same brightness or flux of about 150 lumens. The white and green light sources 134 and 136 produce the same brightness or flux of about 600 lumens, which is four times that of the light sources 124 and 126. For this reason, the rod lens array 132 is designed to have ¼ the number of rod lenses (¼ the exposure aperture) of the rod lens array 122. The effective brightness of illumination is therefore the same for all of the lamps 134, 136, 124 and 126.

In operation, a portion of the belt 76 is charged by the charging unit 86 and is moved rightward below the plate 72. The rod lens assembly 130 is moved by the wire 110 along with the belt 76 and the white light source 134 is energized so that the rod lens array 132 forms an image of the document 74 on the belt 76. The black section **104*b* of the developing unit 104 is moved into contact with the belt 76 to transfer black toner particles thereto and form a monochrome (black and white) image on the belt 76. The paper 96 is advanced into contact with the drum 92 and cut off by the cutter 102. The drum 92 is provided with suction or similar means (not shown) to cause the paper 96 to wrap around the drum 92 and firmly adhere thereto. The belt 76 and paper 96 wrapped around the drum 92 are then rollingly pressed into contact by the roller 92 and the monochrome toner image is transferred to the paper 96. Residual toner particles are removed from the belt 76 by the cleaning unit 88 and the belt 76 is discharged by the lamp 90. The portion of the belt 76 is again charged by the corona charging unit 86 and moved rightward under the plate 72. The rod lens assembly 130 is returned to its leftmost position and thereafter moved rightward along with the belt 76. This time, however, the white light source 134 is de-energized and the red light source 124 is energized to form a red image on the belt 76. The yellow (complement of red) section 104*y*, of the developing unit 104 is moved into contact with the belt 76 to form a yellow toner image on the belt 76. This yellow toner image is transferred to the paper 96 on the drum 92 in such a manner as to be superimposed on the monochrome toner image formed thereon previously. In a similar manner, the blue and green light sources 126 and 136 are sequentially energized so that the rod lens array 122 forms blue and green images on the belt 76. The magenta and cyan (complements of blue and green) sections 104*m* and 104*c* are moved into contact with the belt 76 to produce magenta and cyan toner images which are transferred to the paper 96 on the drum 92 in superimposition with the monochrome and yellow toner images to produce a full color toner image. The paper 96 is then removed from the drum 92 and the various toner images fixed thereto by a fixing unit (not shown) to provide a full color copy of the original document 74**.

It is to be noted that since the color copying machine shown in FIG. 7 is provided with the white light source 134 and the black section **104*b* of the developing unit 104, the conventional monochrome electrophotography may also be easily performed. In this connection, it is to be further noticed that the black section 104*b* is arranged in a manner as to firstly move into contact with the belt 76 to transfer black toner particles thereto and form a monochrome image on the belt 76** so that the monochrome electrophotographic speed is desirably increased.

In cases in which the spectral response of the photoconductive member is not uniform, the exposure aperture may be varied in such a manner as to compensate therefor. The effective brightness of illumination may be redefined as that which produces a predetermined effect on the photoconductive member.

It will be seen that the present invention varies the number of rod lenses and therefore the exposure aperture to compensate for differences between various colored light sources and filters to provide equal brightness of illumination from the light sources. This may be accomplished using a single rod lens array and selectively covering ends of some of the rod lenses or providing different rod lens arrays having different numbers of rod lenses for the different color light sources. Many modifications within the scope of the present disclosure will become possible to those skilled in the art after receiving the teachings herein.

What is claimed is:

1. Color electrophotography apparatus comprising:

a photoconductive member;

a plurality of elongated light transmitting elements provided between the surface of the photoconductive member and the surface of an original document, the cross sectional area of the light transmitting elements constituting an exposure aperture;

drive means for producing relative movement between the original document, photoconductive member and light transmitting elements so that the original document and photoconductive member move relative to the ends of the light transmitting elements at the same speed;

illumination means to illuminate the original document for three sequential color separation exposures so that three respective color images are formed on the surface of the photoconductive member by the light transmitting element; and means for covering the ends of predetermined numbers of the light transmitting elements and thereby the exposure aperture in accordance with the brightness of illumination of the original document by the illumination means during the color separation exposures in such a manner that the effective brightness of illumination is the same for the three color separation exposures.

2. The apparatus according to claim 1, further comprising neutral density filters and means for selectively moving the neutral density filters into the optical path of the light transmitting elements for the respective color separation exposures so that the combination of the neutral density filters and the means for covering the ends of predetermined numbers of the light transmitting elements produce the same effective brightness of illumination for the three color separation exposures.

3. The apparatus according to claim 1, in which the illumination means comprises a source of white light and three primary color filters movable into position between the source and the surface of the photoconductive member.

4. The apparatus according to claim 1, in which the light transmitting elements are rod lenses.

5. The apparatus according to claim 1, in which the illumination means is further operative to illuminate the surface of the document for a white light exposure.

6. Color electrophotography apparatus comprising:

a photoconductive member;

a plurality of assemblies comprising a plurality of elongated light transmitting elements provided between the surface of the photoconductive member and the surface of an original document, each assembly having different predetermined numbers of light transmitting elements, the cross sectional area of the light transmitting elements of each assembly constituting an exposure aperture;

drive means for producing relative movement between the original document, photoconductive member and light transmitting elements so that the original document and photoconductive member move relative to the ends of the light transmitting elements at the same speeds;

illumination means to illuminate the original document for three sequential color separation exposures so that three respective color images are formed on the surface of the photoconductive member by the light transmitting elements; and means for interchanging the assemblies for the respective color separation exposures.

7. The apparatus according to claim 6, in which the illumination means comprises a plurality of sources of light movable with the respective assemblies relative to the surfaces of the original document and the photoconductive member.

* * * * *